(12) United States Patent
Ono et al.

(10) Patent No.: US 6,984,943 B2
(45) Date of Patent: Jan. 10, 2006

(54) METHOD AND APPARATUS FOR LIGHTING HIGH PRESSURE DISCHARGE LAMP, HIGH PRESSURE DISCHARGE LAMP APPARATUS, AND PROJECTION-TYPE IMAGE DISPLAY APPARATUS

(75) Inventors: Syunsuke Ono, Takatsuki (JP); Minoru Ozasa, Kyoto (JP); Masahiro Yamamoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 22 days.

(21) Appl. No.: 10/871,130

(22) Filed: Jun. 18, 2004

(65) Prior Publication Data

US 2005/0023993 A1    Feb. 3, 2005

(30) Foreign Application Priority Data

Jun. 20, 2003   (JP)   .............................. 2003-177352

(51) Int. Cl.
   *G05F 1/00*        (2006.01)

(52) U.S. Cl. ...................................... 315/291; 315/308

(58) Field of Classification Search ........ 315/224–225, 315/291, 307–308, DIG. 5, DIG. 7
   See application file for complete search history.

(56) References Cited

U.S. PATENT DOCUMENTS

| | | | | |
|---|---|---|---|---|
| 5,142,203 | A * | 8/1992 | Oda et al. .................... | 315/308 |
| 5,463,287 | A * | 10/1995 | Kurihara et al. ............ | 315/307 |
| 6,288,501 | B1 * | 9/2001 | Nakamura et al. .......... | 315/307 |
| 6,605,906 | B2 * | 8/2003 | Okamoto et al. ........... | 315/291 |
| 6,670,780 | B2 * | 12/2003 | Ono et al. ................... | 315/291 |
| 6,750,620 | B2 * | 6/2004 | Suzuki ....................... | 315/291 |
| 6,794,832 | B2 * | 9/2004 | Yamamoto et al. ......... | 315/307 |
| 6,838,838 | B2 * | 1/2005 | Okamoto et al. ........... | 315/308 |

FOREIGN PATENT DOCUMENTS

JP       08-078175       3/1996

* cited by examiner

*Primary Examiner*—Thuy Vinh Tran

(57) ABSTRACT

A lighting method for a high pressure discharge lamp in which a high-pressure pulse is applied to cause a dielectric breakdown, and then in step S1, it is judged whether the lamp voltage is higher than 25 volts as the current switching voltage. If it is judged negatively in step S1, the control circuit (304) performs a constant current control with the current limiting level set to 6 amperes (step S2). If it is judged that the lamp voltage is higher than 25 in step S1, the control circuit (304) performs a constant current control with the current limiting level set to 4 amperes (step S3). When the lamp voltage rises and reaches 50 volts, the control circuit (304) performs a constant power control so that the lamp power remains to be 200 W.

10 Claims, 16 Drawing Sheets

FIG.5

200W LAMP

| | | CURRENT SWITCHING VOLTAGE Va | | | | | | |
|---|---|---|---|---|---|---|---|---|
| | | 10V | 15V | 20V | 25V | 30V | 35V | 40V |
| FIRST CURRENT LIMITING LEVEL | 8.0A | 2 | 2 | 2 | 2 | 9 | 12 | 14 |
| | 7.5A | 2 | 2 | 2 | 2 | 8 | 11 | 13 |
| | 7.0A | 2 | 2 | 2 | 2 | 8 | 10 | 12 |
| | 6.5A | 2 | 2 | 2 | 2 | 7 | 9 | 11 |
| | 6.0A | 2 | 2 | 2 | 2 | 6 | 8 | 10 |
| | 5.5A | 2 | 2 | 2 | 2 | 6 | 7 | 9 |
| | 5.0A | 2 | 2 | 2 | 2 | 5 | 6 | 8 |
| | 4.5A | 2 | 2 | 2 | 2 | 4 | 4 | 6 |
| | 4.0A | 2 | 2 | 2 | 2 | 2 | 2 | 2 |

FIG.7

| CURRENT SWITCHING VOLTAGE Va | | | | | | | | | | | |
|---|---|---|---|---|---|---|---|---|---|---|---|
| 20V | 21V | 22V | 23V | 24V | 25V | 26V | 27V | 28V | 29V | 30V |
| 2 | 2 | 2 | 2 | 2 | 2 | 3 | 3 | 4 | 5 | 6 |

FIG.8

120W LAMP

| | CURRENT SWITCHING VOLTAGE Va | | | | | | |
|---|---|---|---|---|---|---|---|
| FIRST CURRENT LIMITING LEVEL | | 10V | 15V | 20V | 25V | 30V | 35V | 40V |
| | 6.5A | 2 | 2 | 2 | 2 | 12 | 15 | 16 |
| | 6.0A | 2 | 2 | 2 | 2 | 10 | 14 | 15 |
| | 5.5A | 2 | 2 | 2 | 2 | 9 | 13 | 14 |
| | 5.0A | 2 | 2 | 2 | 2 | 8 | 12 | 13 |
| | 4.5A | 2 | 2 | 2 | 2 | 7 | 10 | 11 |
| | 4.0A | 2 | 2 | 2 | 2 | 6 | 9 | 10 |
| | 3.5A | 2 | 2 | 2 | 2 | 5 | 8 | 9 |
| | 3.0A | 2 | 2 | 2 | 2 | 4 | 6 | 7 |
| | 2.5A | 2 | 2 | 2 | 2 | 2 | 2 | 2 |

FIG.10

LIGHT RISE TIME FOR 50%

| FIRST CURRENT LIMITING LEVEL | REQUIRED TIME FOR 50% | REDUCTION RATE |
|---|---|---|
| 4A | 45s | 100% |
| 5A(1.25 TIMES) | 39s | 87% |
| 6A(1.5 TIMES) | 33s | 73% |
| 7A(1.75 TIMES) | 25s | 56% |

METHOD AND APPARATUS FOR LIGHTING HIGH PRESSURE DISCHARGE LAMP, HIGH PRESSURE DISCHARGE LAMP APPARATUS, AND PROJECTION-TYPE IMAGE DISPLAY APPARATUS

BACKGROUND OF THE INVENTION (1) Field of the Invention

The present invention relates to a method and an apparatus for lighting a high pressure discharge lamp, a high pressure discharge lamp apparatus, and a projection-type image display apparatus.

(2) Description of the Related Art

High pressure discharge lamps such as high pressure mercury lamps or metal halide lamps generally provide highly bright luminous flux, which is regarded as an excellent advantageous effect thereof. On the other hand, a problem of such high pressure discharge lamps is that they require a long time from a start of discharge until they obtain a luminous flux that has a certain level of brightness (hereinafter, the time required for obtaining such a luminous flux is referred to as "light rise time"). Reducing the light rise time has been a longstanding challenge in the field of the high pressure discharge lamp.

Especially, projection-type image display apparatuses (hereinafter referred to as "projectors") are desired to have high illuminance recently, and therefore need to use higher-output high pressure discharge lamps than before.

However, high pressure discharge lamps become larger in size as they become higher in power. When this happens, the thermal capacity of the lamp components including the glass bulb increases. This decreases the speed at which the light-emitting metal evaporates in the discharge space, further prolonging the light rise time.

Some lighting methods for motor vehicle high pressure discharge lamps have solved this problem by first supplying the lamps with much higher power than the power at the normal lighting to promote the light rise, then supplying the lamps with a constant power (see, for example, Japanese Laid-Open Patent Application No. H04-349396 (Patent Document 1), Japanese Laid-Open Patent Application No. H08-078175 (Patent Document 2)).

However, if the above-mentioned technologies for motor vehicles are applied to high pressure discharge lamps for projectors, edges of the lamp electrodes would melt. This is a serious damage to the electrodes and lamps.

The motor vehicle high pressure discharge lamps are standardized by Japan Electric Lamp Manufacturers Association (JELMA) or the like, and they are designed to have leeway in electrode size relative to the lamp power. As a result, even if a much higher power than the power at the normal lighting is supplied to the lamps for motor vehicles, the lamp electrodes do not suffer much damage. Also, in the lamps for motor vehicles, a xenon gas is introduced at a pressure as high as 500 kPa or more. This causes the resistance component in the discharge space to be high, restricting the lamp current to a level not so high. For these reasons, electrodes of the motor vehicle high pressure discharge lamps do not suffer damage with use of the lighting methods disclosed in the Patent Documents 1 and 2.

However, high pressure discharge lamps for projectors are required to provide high brightness to maintain the screen brightness.

To provide high brightness, it is essential to maintain the electrode edges at high temperatures to increase the arc temperature. For this reason, the size of the electrodes needs to be reduced as much as possible to reduce the thermal capacity. Also, to increase the converging efficiency of the concave reflecting mirror, a point light source is preferred. However, reduction in the distance between electrodes leads to a larger amount of lamp current flowing there. Also, supply of an excessively high power may lead to an excessive increase of the lamp current.

Accordingly, if a power much higher than a power at a normal lighting is supplied to a high pressure discharge lamp for a projector under the same condition as a high pressure discharge lamp for a motor vehicle, the temperature at edges of electrodes would increase abnormally, melting the electrodes. When this happens, an appropriate point light source is not obtained, and in the worst case, a lighting failure occurs.

One might think that a rare gas such as xenon may be introduced at a high pressure into the projector high pressure discharge lamp to increase the resistance in the discharge space, as in the motor vehicle high pressure discharge lamps. However, as described earlier, high pressure discharge lamps for projectors are relatively large in size, and therefore it is difficult to introduce a rare gas at a pressure higher than a certain pressure, from a viewpoint of the manufacturing technology.

Due to the circumstances described above, in conventional lighting methods for high pressure discharge lamps for projectors, to prevent the electrodes from suffering damage, a constant current control is performed so as to supply an electric current, which does not exceed the maximum value of a current which is supplied while the constant power control is performed, for a duration of the initial lighting period between a lighting start and a constant power control. In such circumstances, it is extremely difficult to reduce the light rise time.

SUMMARY OF THE INVENTION

The object of the present invention is therefore to provide a lighting method and apparatus for a high pressure discharge lamp, a high pressure discharge lamp apparatus, and a projection-type image display apparatus which provide a reduced light rise time, without causing damage to electrodes even in widely available high pressure discharge lamps.

The above object is fulfilled by a lighting method for a high pressure discharge lamp, comprising, during an initial lighting period between a lighting start and a constant power control that is performed when a lamp voltage reaches a predetermined voltage value: a first step in which a first lamp current, which is higher than a predetermined current value, is supplied for a partial or whole duration of a first lighting period that starts with the lighting start and lasts until the lamp voltage reaches a first voltage value at which an arc spot starts to be formed continuously on an electrode; and a second step in which a second lamp current, which is not higher than the predetermined current value, is supplied for a partial or whole duration of a second lighting period that succeeds the first lighting period and lasts until the constant power control is performed.

The above object is also fulfilled by a lighting method for a high pressure discharge lamp in which an inter-electrode distance ranges from 0.5 mm to 2.0 mm inclusive, an amount of mercury contained therein ranges from 150 mg/cm$^3$ to 350 mg/cm$^3$ per inner capacity of a light-emitting portion, and argon, krypton or xenon is introduced as a rare gas into an inner space at a pressure ranging from 10 kPa to 40 kPa inclusive, the lighting method comprising, during an initial lighting period between a lighting start and a constant power control that is performed when a lamp voltage reaches a predetermined voltage value: a first step in which a first lamp current, which is higher than a predetermined current value, is supplied for a partial or whole duration of a first lighting period that starts with the lighting start and lasts until the lamp voltage reaches a first voltage value that is not higher than 27 volts; and a second step in which a second lamp current, which is not higher than the predetermined current value, is supplied for a partial or whole duration of a second lighting period that succeeds the first lighting period and lasts until the constant power control is performed.

With the above-described lighting methods, a large current is supplied in the first lighting period, accelerating the temperature rising inside the light-emitting portion of the high pressure discharge lamp, and reducing the light rise time, and a current restricted to a predetermined level is supplied in the second lighting period. It has been confirmed that the electrodes are not damaged when the current is supplied in the stated manner.

In the above-described lighting method, the predetermined current value may be substantially equal to a maximum value of a current which is supplied while the constant power control is performed.

With the above-stated construction, it is possible to supply as large a current as possible within a range that does not cause a damage to the electrodes, in the second lighting period. This also contributes to the reduction of the light rise time.

In the above-described lighting method, the first lamp current supplied in the first lighting period may not be lower than 1.25 times the predetermined current value.

With the above-stated construction, it is possible to reduce the light rise time to a satisfactory extent.

The above object is also fulfilled by a lighting apparatus for a high pressure discharge lamp, for performing a constant power control over the high pressure discharge lamp when a lamp voltage reaches a predetermined voltage value after a dielectric breakdown is caused to light the high pressure discharge lamp, the lighting apparatus comprising: a current supply unit operable to supply a current to the high pressure discharge lamp; and a current control unit operable to control the current supply unit so that a first lamp current, which is higher than a predetermined current value, is supplied for a partial or whole duration of a first lighting period that starts with the lighting start and lasts until the lamp voltage reaches a first voltage value at which an arc spot starts to be formed continuously on an electrode, a second lamp current, which is not higher than the predetermined current value, is supplied for a partial or whole duration of a second lighting period that succeeds the first lighting period and lasts until the constant power control is performed.

The above object is also fulfilled by a lighting apparatus for a high pressure discharge lamp in which an inter-electrode distance ranges from 0.5 mm to 2.0 mm inclusive, an amount of mercury contained therein ranges from 150 mg/cm$^3$ to 350 mg/cm$^3$ per inner capacity of a light-emitting portion, and argon, krypton or xenon is introduced as a rare gas into an inner space at a pressure ranging from 10 kPa to 40 kPa inclusive, the lighting apparatus performing a constant power control over the high pressure discharge lamp when a lamp voltage reaches a predetermined voltage value after a dielectric breakdown is caused to light the high pressure discharge lamp, the lighting apparatus comprising: a current supply unit operable to supply a current to the high pressure discharge lamp; and a current control unit operable to control the current supply unit so that a first lamp current, which is higher than a predetermined current value, is supplied for a partial or whole duration of a first lighting period that starts with the lighting start and lasts until the lamp voltage reaches a first voltage value that is not higher than 27 volts, and a second lamp current, which is not higher than the predetermined current value, is supplied for a partial or whole duration of a second lighting period that succeeds the first lighting period and lasts until the constant power control is performed.

With the above-described lighting apparatuses, the above-described superior lighting methods are achieved, enabling the light rise time to be reduced without damaging the electrodes of the high pressure discharge lamp.

In the above-described lighting apparatus, the predetermined current value may be substantially equal to a maximum value of a current which is supplied while the constant power control is performed.

With the above-stated construction, it is possible to supply as large a current as possible within a range that does not cause a damage to the electrodes, in the second lighting period. This also contributes to the reduction of the light rise time.

The above object is also fulfilled by a high pressure discharge lamp apparatus, comprising: a high pressure discharge lamp; and a lighting apparatus as defined above for lighting the high pressure discharge lamp.

With the above-stated construction, a high pressure discharge lamp apparatus with reduced light rise time is provided.

The above object is also fulfilled by a projection-type image display apparatus for which the high pressure discharge lamp as defined above is used.

With the above-stated construction, a projection-type image display apparatus with reduced light rise time is provided.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 5 shows levels of damage to electrodes that correspond to combinations of the lamp voltage Va value and the first current limiting level;

FIG. 7 shows the number of melted turns of the electrode coil when the current switching voltage Va is set to 20 to 30 volts in 1-volt steps;

FIG. 8 shows results of an experiment similar to the experiment of FIG. 5, for the high pressure mercury lamp rated as 120 W;

FIG. 10 shows (a) the time required for the luminous flux to reach 50% of the luminous flux obtained at the normal lighting ("required time for 50%") and (b) the reduction rate of the required time for 50%, which are obtained from the experiment results shown in FIG. 9;

DESCRIPTION OF THE PREFERRED EMBODIMENT

The following describes a preferred embodiment of the present invention including a lighting apparatus for a high pressure discharge lamp. In the present embodiment, a high pressure mercury lamp is used as the high pressure discharge lamp.

1. Construction of High Pressure Mercury Lamp 100

First, the construction of a high pressure mercury lamp 100 for a projector to be lighted will be described with reference to FIG. 1.

Figure 1:
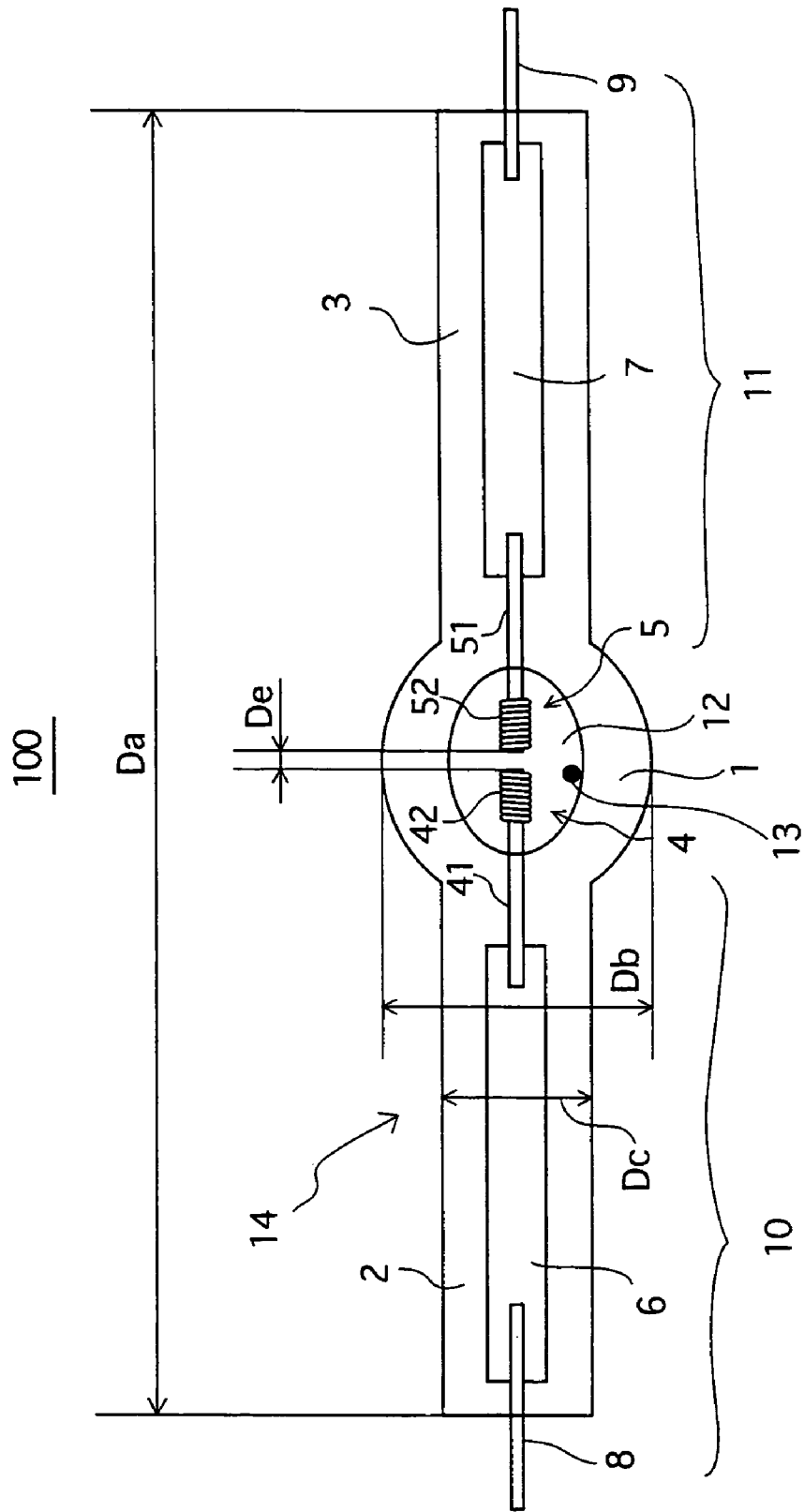
FIG. 1 shows the construction of a high pressure mercury lamp for a projector to be lighted by the lighting method in the embodiment of the present invention.

As shown in FIG. 1, the high pressure mercury lamp 100 includes a bulb 14 made of quartz glass. The bulb 14 is composed of a light-emitting portion 1, a first seal portion 2 and a second seal portion 3, where the first seal portion 2 and the second seal portion 3 extend in opposite directions from the light-emitting portion 1 which is substantially spherical or spheroid and has a discharge space 12 therein. Passing through the first seal portion 2 and the second seal portion 3, electrode support bodies 10 and 11 are formed, respectively. The electrode support body 10 is composed of an electrode 4, a molybdenum foil 6, and a lead 8 which are connected to one another in the stated order. Similarly, the electrode support body 11 is composed of an electrode 5, a molybdenum foil 7, and a lead 9 which are connected to one another in the stated order.

The electrodes 4 and 5 are made of tungsten. The electrode 4 is composed of an electrode rod 41 and an electrode coil 42 that is wound around the electrode rod 41 at a portion including an end thereof. Similarly, the electrode 5 is composed of an electrode rod 51 and an electrode coil 52. The electrodes 4 and 5 extend into the discharge space 12 from substantially opposite directions, the ends thereof facing each other. The leads 8 and 9 are made of molybdenum and extend to outside from ends of the first and second seal portions 2 and 3, respectively.

An inter-electrode distance De is set to a range from 0.5 mm to 2.0 mm so as to be close to the point light source.

The discharge space in the light-emitting portion 1 contains certain amounts of: mercury 13 which is a light-emitting metal; rare gases such as argon, krypton and xenon used as starting aid gases; and halogen such as iodine and bromine.

More particularly, in the present embodiment, the amount of mercury 13 contained in the discharge space is in a range from 150 mg/cm$^3$ to 350 mg/cm$^3$ per inner capacity of the light-emitting portion 1, the pressure at which the rare gases are introduced into the space is in a range from 10 kPa to 40 kPa when the lamp is at ordinary temperature, and the amount of halogen contained in the discharge space is in a range from $1 \times 10^{-10}$ mol/cm$^3$ to $1 \times 10^{-4}$ mol/cm$^3$.

The measurement of the lamp is as follows.

Lamp entire length Da: 40 mm to 100 mm

Light-emitting portion external diameter Db: 8 mm to 15 mm

Seal portion external diameter Dc: 4 mm to 10 mm

It should be noted here that in the present document, the expression "(from) a to b" for a value range indicates a range from the lower limit a to the upper limit b, inclusive.

2. Lighting Method for High Pressure Mercury Lamp 100

Secondly, a preferable lighting method for the high pressure mercury lamp 100 will be described.

Figure 2:
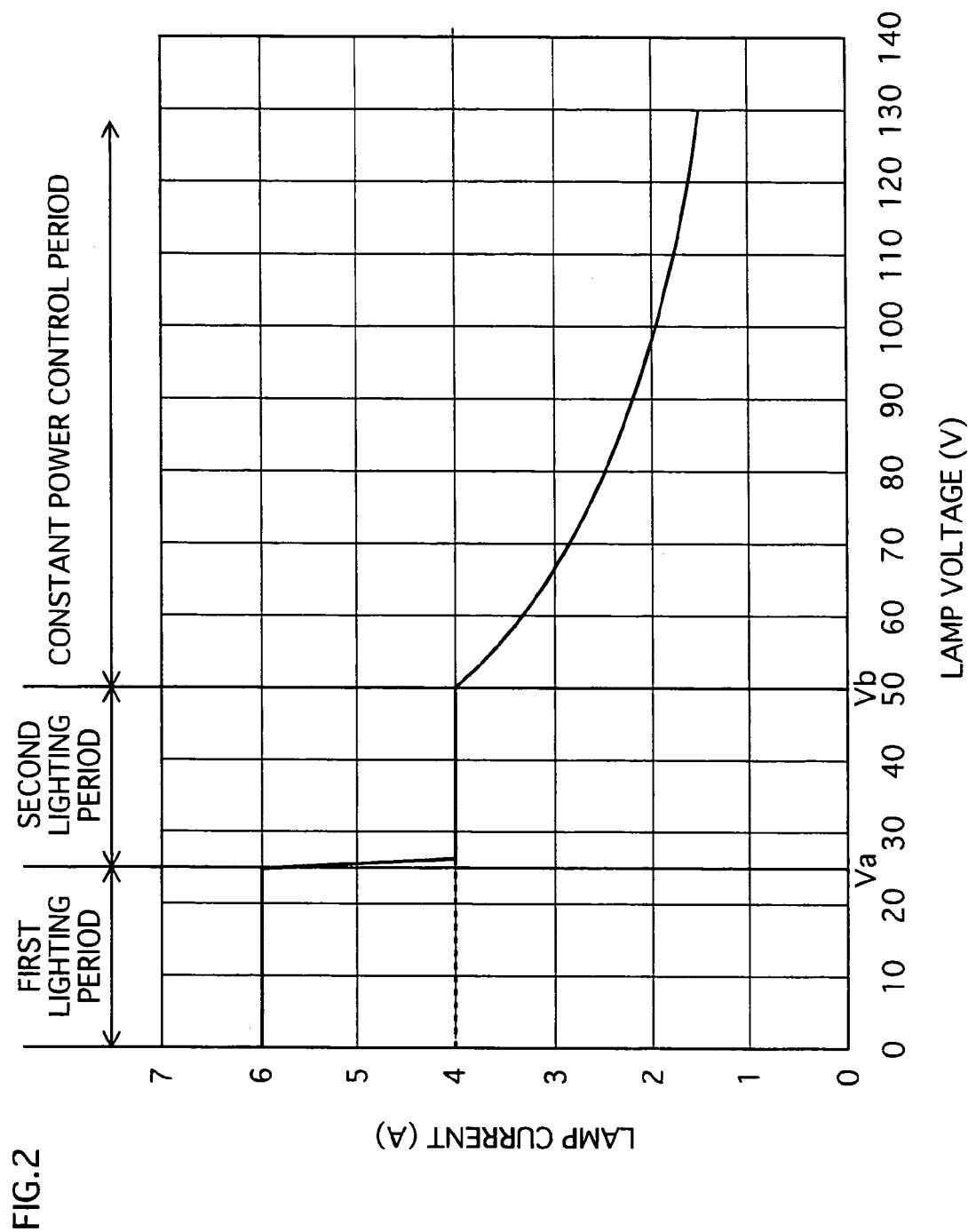
FIG. 2 is a plot of lamp current vs. lamp voltage supplied to the high pressure mercury lamp in the embodiment of the present invention.

FIG. 2 is a plot of lamp current vs. lamp voltage observed after a dielectric breakdown that is caused when a lighting apparatus, which will be described later (see FIG. 11), applies a high-voltage pulse to the high pressure mercury lamp 100 rated as 200 W.

In the high pressure mercury lamp 100 after the dielectric breakdown, the mercury vapor pressure and the lamp voltage increase as the temperature in the discharge space rises. As shown in FIG. 2, during a first lighting period that ends as the lamp voltage reaches Va, the lamp current is controlled to be a constant current of 6 amperes. The lamp current is then controlled to be a constant current of 4 amperes during a second lighting period that, following the first lighting period, starts after the lamp voltage reaches Va and ends as it reaches Vb (in the present embodiment, Vb=50 volts).

The constant current of 4 amperes can be supplied by, for example, using a known constant current circuit and setting the current limiting level to 4 amperes.

After the lamp voltage reaches Vb (50 volts), a constant power control is performed so as to maintain the rated lamp power of 200 W (the period during which the constant power control is performed is referred to as a constant power control period) The dotted line in FIG. 2 indicates a lamp current value that would be observed in case of a conventional lighting method during the first lighting period. As will be understood by comparison, the present invention supplies, in the first lighting period immediately after the start of the lighting, 6 amperes of lamp current that is higher than the conventional lamp current value. This increases the heat release value of the electrodes 4 and 5 and improves the temperature rise in the discharge space.

The voltage Va, which demarcates the first lighting period, is set to 25 volts. The inventors of the present invention confirmed through experiments that the electrodes do not suffer damage if a lamp current (6 amperes in the present embodiment), which is higher than the maximum current value (a predetermined current value: 4 amperes) in the constant power control period, is supplied during the first lighting period. This will be detailed later with reference to experiment data.

Figure 3:
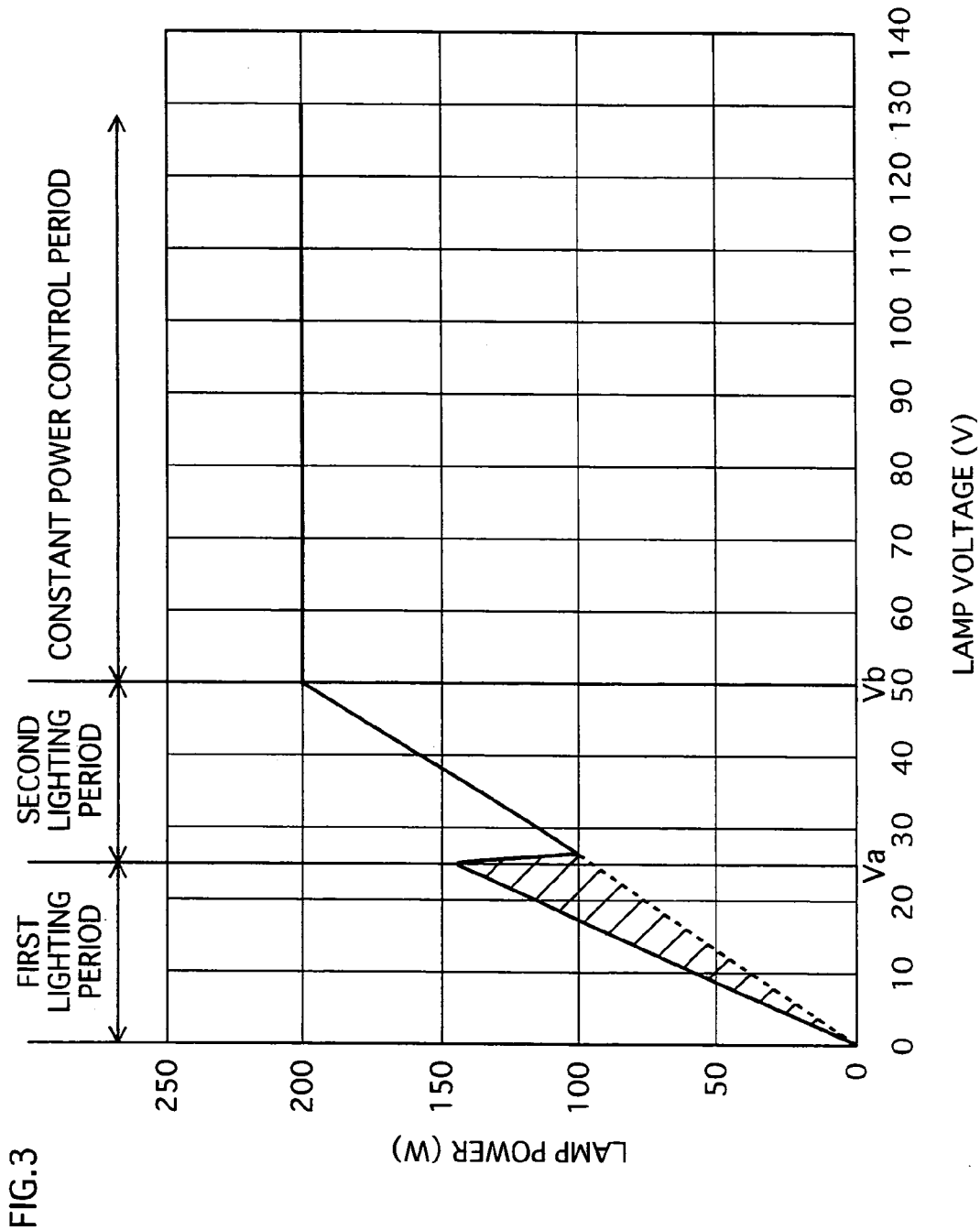
FIG. 3 is a plot of lamp power vs. lamp voltage supplied in accordance with the control characteristics shown in FIG. 2.
Figure 4:
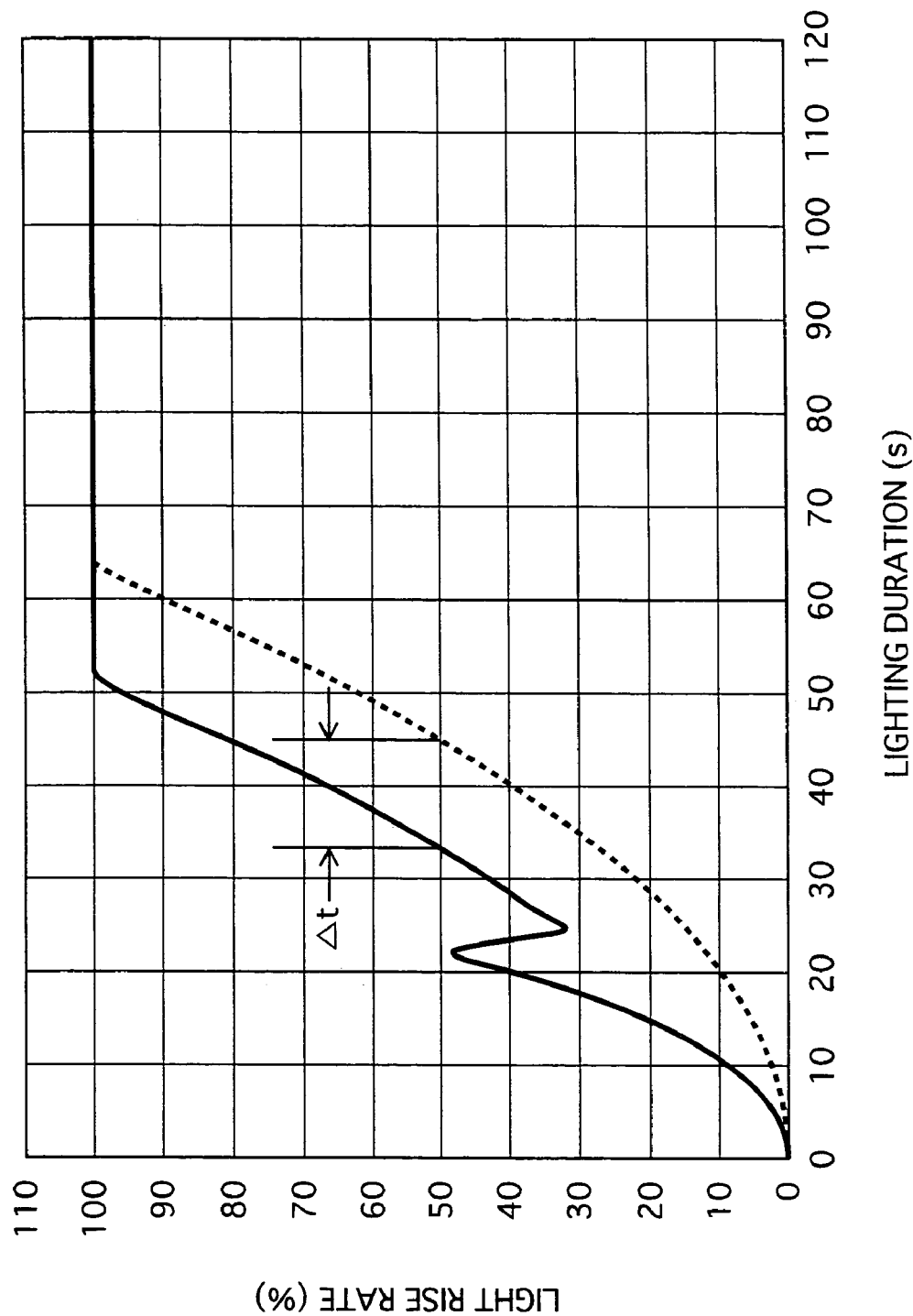
FIG. 4 shows the light rise characteristics of high pressure mercury lamp in the case where the lamp voltage and the lamp current are supplied in accordance with the control characteristics shown in FIG. 2.

FIG. 3 is a plot of lamp power vs. lamp voltage observed when the lamp current control is performed in accordance with the control characteristics shown in FIG. 2. FIG. 4 is a plot of a luminous flux rise rate, when a luminous flux level at the normal lighting is 100%, vs. the lighting duration from the start of the lighting when, as is the case with FIG. 3, the lamp current control is performed in accordance with the control characteristics shown in FIG. 2.

In both FIGS. 3 and 4, the solid line indicates the values observed with the lighting method of the present embodiment, and the dotted line indicates the values observed with the conventional lighting method.

As shown in FIG. 3, the lighting method of the present embodiment supplies an amount of power that is larger than the conventional lighting method by an area represented by the diagonal shading. As a result of this, as shown in FIG. 4, the lighting method of the present embodiment reaches 50% of luminous flux at the normal lighting earlier than the conventional lighting method by At (approximately 12 seconds), that is to say, reduces the time (light rise time) required for reaching 50% of luminous flux by approximately 12 seconds. This is approximately 27% of reduction since the conventional lighting method requires approximately 45 seconds for reaching the same.

3. Optimum Ranges for Lamp Voltage Va and Lamp Current in First Lighting Period

Now, the optimum ranges for the voltage Va, which demarcates the first lighting period from the second lighting period, and the lamp current in the first lighting period will be discussed based on the experiment results.

Experiment 1

An experiment was conducted to determine the optimum range for the voltage Va for the high pressure mercury lamp 100 rated as 200 W.

The lamps used in this experiment as the test pieces are high pressure mercury lamps having the construction shown in FIG. 1. Specifications of the lamps are as follows.

Amount of mercury contained in the discharge space: 200 mg/cm$^3$ per inner capacity Pressure at which rare gases are introduced into the space at ordinary temperature: 30 kPa Inter-electrode distance De: 1.5 mm Lamp entire length Da: 90 mm Light-emitting portion external diameter Db: 13 mm Seal portion external diameter Dc: 8.0 mm Each electrode has an electrode rod around which an eight-turn double coil is formed. The electrode rod diameter d1 (see FIG. 6A) is set to 0.4 mm. The wire diameter d2 of the electrode coil is set to 0.25 mm.

FIG. 5 shows levels of damage to electrodes that were observed after the experiment on the test pieces. The values (indicating the damage levels) shown in FIG. 5 respectively correspond to combinations of (a) a constant current value (first current limiting level) that is supplied in the first lighting period and ranges from the conventional 4 amperes to 8 amperes, and (b) the lamp voltage Va demarcating the first lighting period. It should be noted here that the lamp voltage Va may also be referred to as "current switching voltage" since on reaching the lamp voltage Va, the first current limiting level switches to the second current limiting level, namely a constant current value supplied in the second lighting period.

The numerals "2" to "14" shown in the boxes of FIG. 5 each indicate a sum of the number of turns that melt at the ends of the two electrode rods after the lamp is lighted for one hour.

Figure 6A:
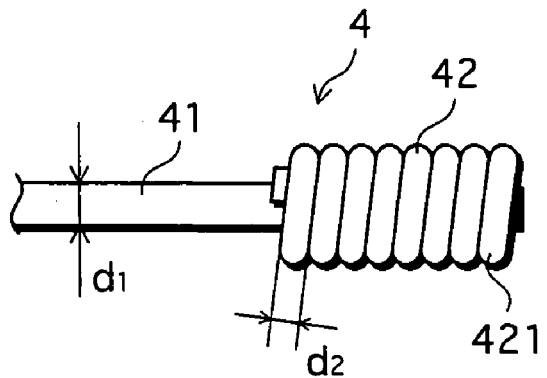
FIG. 6A shows the shape of an end of an electrode before the lighting experiment.

FIG. 6A is an enlarged view of the electrode 4 before the experiment. As shown in FIG. 6A, in the electrode 4, the electrode coil 42, which is an eight-turn double coil, is formed at an end of the electrode rod 41 (the electrode 5 is also constructed in this manner).

Figure 6B:
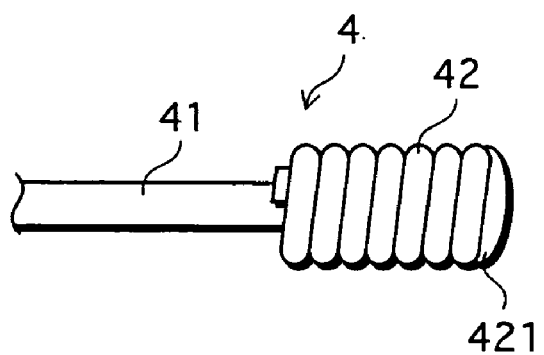
FIG. 6B shows how the end of the electrode melts with a conventional lighting method.
Figure 6C:
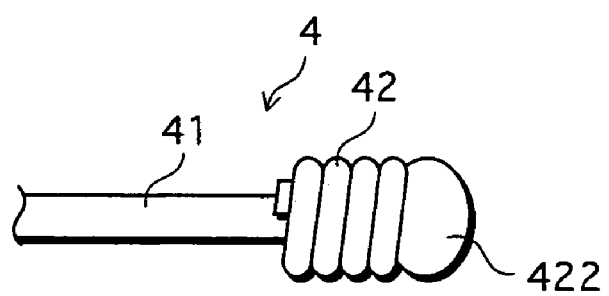
FIG. 6C shows a serious damage to the electrode with four turns of the electrode coil wound around the end of the electrode having been melted.

In the conventional lighting method (in which a lamp current of four amperes is supplied over a certain period which does not include the first and second lighting periods of the present embodiment), the lamps are designed to allow only the first turn 421 of the electrode coil 42 to have melted after one hour of lighting, as shown in FIG. 6B.

It is therefore determined for this experiment that if two or more turns have melted for each electrode and four or more turns have melted in total for each pair of electrodes after the experiment, the pair of electrodes is evaluated as damaged.

Now, as understood from the test results shown in FIG. 5, the electrodes are damaged if the current switching voltage Va is set to 30 to 40 volts and the current limiting level is set to 4.5 to 8.0 amperes.

As the test results indicate, it was found that when the current switching voltage Va is set to 25 volts, the electrodes are not damaged even if the current limiting level is set to 4.5 to 8.0 amperes.

In the experiment explained so far with reference to FIG. 5, the current switching voltage Va was set in steps of 5 volts. To obtain more detailed data, another experiment was conducted with the current switching voltage Va being set to 20 to 30 volts in 1-volt steps. FIG. 7 shows the results of the experiment.

In this additional experiment, the first current limiting level was fixed to 6 amperes and the second current limiting level was, as is the case with the former experiment, set to 4 amperes.

As understood from the experiment data shown in FIG. 7, it was found that the electrodes are not "damaged", with two turns of the electrodes coils having melted in total, when the current switching voltage Va is set to not higher than 25 volts, and that the electrodes are "damaged", with four or more turns having melted in total, when the current switching voltage Va is set to not lower than 28 volts. In regards with the cases where three turns melted when the current switching voltage Va was set to 26 or 27 volts, it could not be judge whether the electrodes were damaged or not. As a result, a life test was conducted to determine whether such electrodes with three melted turns in coils can be in practical use.

In the lamp life test, a full-bridge electronic ballast of a rectangular wave lighting with a power rating of 200 W was used, the first current limiting level was set to 6 amperes, and the second current limiting level was set to 4 amperes. The lamp life test was conducted for each of the cases where the current switching voltage was set to 25, 27 and 28 volts, respectively. The high pressure discharge lamp 100 was incorporated in a lamp unit 200 (see FIG. 13), which will be described later, kept in a horizontal position, and put into a cycle of being lighted on for 3.5 hours and lighted off for 0.5 hours. Five test samples per condition (the current switching voltage is 25, 27 or 28 volts) were subjected to the life test.

The life characteristics were evaluated by the illuminance maintenance ratio after 1,000 hours of cumulative lighting time period.

The average value of the illuminance maintenance ratio was: 86.3% when the current switching voltage was set to 25 volts; 83.3% when the current switching voltage was set to 27 volts; and 75.5% when the current switching voltage was set to 28 volts. The acceptable criterion for life of such 200 W lamps is that the illuminance maintenance ratio is not lower than 80% when the lamp has been lighted on for 1,000 hours in total. Based on this, lamps with the current switching voltage set to 26 or 27 volts are acceptable in terms of the life though they show slightly inferior characteristics compared with those with the current switching voltage set to 25 volts, and it is therefore judged that the electrodes with three melted turns in coils can be in practical use. The life test results also indicate that lamps with the current switching voltage set to 28 volts do not clear the acceptable criterion for life.

From such results of the life test, it can be said that the lamp voltage Va (as the current switching voltage) should not be higher than 25 volts to keep the lamp life characteristics intact, and should not be higher than 27 volts for the lamp to be in practical use.

Analysis

In the experiment of FIG. 5, the first current limiting level was set to 8 amperes at the largest. In actuality, however, no damage was observed on the electrodes even when the first current limiting level was set to more than 8 amperes, or even a power that is larger than a power supplied at the normal lighting was supplied in the first lighting period.

As described earlier, conventional high pressure discharge lamps for projectors do not have leeway in electrode size due to the requirement for providing high brightness. It has therefore been considered that it is not desirable to apply, during an initial lighting period between the lighting start and the constant power control, an excessively high power compared with the power for the normal lighting. For this reason, it has been a common practice in this technical field to perform a constant current control during the initial lighting period, supplying an electric current that does not exceed the maximum current value for the constant power control.

However, it was found through the above-described experiments that the electrodes are not damaged even if an electric current exceeding the maximum current value for the constant power control is supplied for a duration between the lighting start and a time when the lamp voltage reaches Va, within the initial lighting period.

The inventors of the present invention observed how the discharge, which occurs between the electrodes, changes before and after the lamp voltage reaches Va, while the lamp is lighted on. It was then found that a highly bright arc is generated substantially at a time when the lamp voltage reaches Va.

It is considered that the highly bright arc is generated as follows. The arc discharge starts immediately after the lamp is lighted on. The arc discharge at this earlier stage does not provide high brightness since it occurs around the whole surface of the electrodes 4 and 5 facing each other. However, as the lamp temperature rises, the amount of vaporized mercury increases and the vapor pressure also increases. And by the time the lamp voltage reaches Va, the vapor pressure has increased enough to cause a thermionic emission point (arc spot) to be formed continuously on an end of a minus phase electrode. It appears that the large shape of the arc discharge has been compressed into the arc spot.

After the arc spot is formed, the temperature of the electrode drastically increases at an area near the arc spot. If a large amount of current is allowed to flow under the circumstance, the temperature of the electrode increases to exceed the melting point of the electrode material, causing the electrode coils to melt.

Conversely, the temperature does not rise drastically and the electrodes are prevented from being damaged even if a large amount of current is allowed to flow during the initial period in which the discharge occurs around the whole surface of the two electrodes, the period before an arc spot is formed on at least one electrode.

The inventors of the present invention further conducted an experiment similar to the above to determine the optimum range for the voltage Va with the high pressure mercury lamp 100 rated as 120 W, while the above-described experiment was conducted for the high pressure mercury lamp 100 rated as 200 W. Specifications of the 120 W lamps are as follows.

Amount of mercury contained in the discharge space: 200 mg/cm$^3$ per inner capacity Pressure at which rare gases are introduced into the space at ordinary temperature: 20 kPa Inter-electrode distance De: 1.0 mm Lamp entire length Da: 55 mm Light-emitting portion external diameter Db: 9.5 mm Seal portion external diameter Dc: 5.0 mm Each electrode has an electrode rod around which an eight-turn double coil is formed. The electrode rod diameter d1 was set to 0.3 mm. The wire diameter d2 of the electrode coil was set to 0.15 mm.

FIG. 8 shows the experiment result values.

As shown in FIG. 8, the second current limiting level for the 120 W lamps was set to 2.5 amperes, in proportion to the decrease in the lamp power from the 200 W lamps. It is found from the results that the electrodes are damaged if the current switching voltage Va is set to 30 to 40 volts and the current limiting level is set to 3.0 to 6.5 amperes.

Also, another experiment was conducted with the current switching voltage Va being set in 1-volt steps. It was confirmed from the experiment results that, as is the case with the experiment results with the 200 W lamps shown in FIG. 7, the lamp voltage Va (as the current switching voltage) should not be higher than 25 volts to keep the lamp life characteristics intact, and should not be higher than 27 volts for the lamp to be in practical use.

The reason why the same value of the optimum current switching voltage Va was obtained for the lamps with different power ratings is considered as follows.

The two types of high pressure mercury lamps are designed in accordance with the same standard. That is to say, the inter-electrode distance ranges from 0.5 mm to 2.0 mm inclusive, the amount of mercury contained in a light-emitting portion ranges from 150 mg/cm$^3$ to 350 mg/cm$^3$ per inner capacity of the light-emitting portion, and argon, krypton or xenon is introduced as a rare gas into an inner space at a pressure within the range from 10 kPa to 40 kPa inclusive.

The lamp voltage during a lamp lighting is determined dominantly by a product of (a) the vapor pressure of mercury, which vaporizes as the temperature in the light-emitting portion rises, and (b) the inter-electrode distance. It is assumed that, according to the above-mentioned standard for the two types of high pressure mercury lamps, an arc spot starts to be continuously formed when the lamp voltage reaches 25 volts. In other words, an arc spot starts to be continuously formed when the mercury vapor pressure is at a level enough to cause the lamp voltage to be 25 volts, even if the two types high pressure discharge lamps have slightly different inter-electrode distance values.

The temperature of the electrode at an area near an arc spot tends to increase in proportion to the amount of lamp current and in inverse proportion to the electrode size. The design standard defines that when different amounts of lamp current are supplied in lamps of different power ratings, the electrodes are adjusted in size so that the temperatures of the electrodes are the same when the constant power control is performed for high brightness. Accordingly, the number of turns of the electrode coil that melt when a larger amount of lamp current than rated is allowed to flow after the lamp voltage reaches 25 volts and an arc spot starts to be continuously formed, is approximately the same, in both lamps having different power ratings.

In this regard, the inventors of the present invention conducted additional experiments on high pressure discharge lamps rated as 90 W to 350 W, such as 150 W, and confirmed that the obtained optimum value for the current switching voltage Va is the same as that obtained in the above-described experiments.

It will be understood from above description that if a larger amount of current than a conventionally supplied amount is supplied during the first lighting period, the electrodes do not have such a level of damage that present a problem in practical use, in so far as the current switching voltage Va, which demarcates the first lighting period, is set to a value not higher than 27 volts.

Experiment 2

The inventors of the present invention also conducted an experiment to determine an amount of current to be supplied in the first lighting period that can effectively reduce the light rise time.

Figure 9:
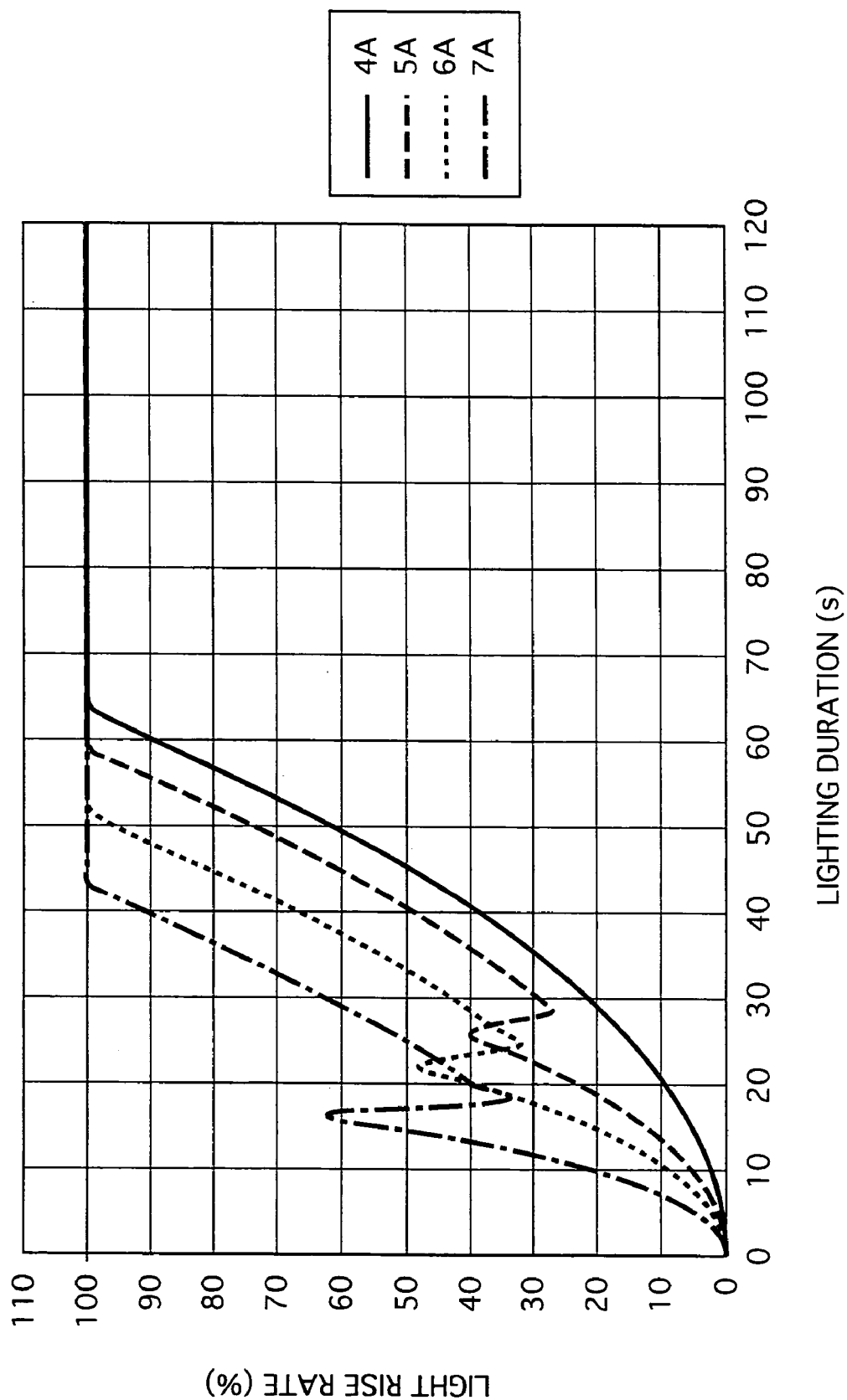
FIG. 9 shows the light rise characteristics of the high pressure mercury lamp in the cases where the first current limiting level is set to 4, 5, 6, and 7 amperes, respectively.

The lamp used in the experiment is rated as 200 W as is the case with the experiment of FIG. 5. The first current limiting level in the first lighting period was respectively set to 4, 5, 6, and 7 amperes for the test pieces, with the second current limiting level set to 4 amperes. FIG. 9 is a plot of a light rise rate vs. the lighting duration from the start of the lighting, as the results of the experiment.

As shown in FIG. 9, a larger amount of light rise time is reduced as the first current limiting level is set to a higher value. It is also found that when a lamp current higher than the maximum value of current which is supplied during the constant power control (hereinafter referred to as "constant power control maximum current value"), which is 4 amperes in this experiment, is supplied in the first lighting period, the light rise time is reduced.

FIG. 10 shows, for each test piece used in the experiment of FIG. 9, (a) the time required for the obtained luminous flux to reach 50% of the luminous flux obtained at the normal lighting ("required time for 50%") and (b) the reduction rate of the required time for 50%, which are obtained from the experiment results shown in FIG. 9.

It should be noted here that the reduction rate is represented by the percentage, where the required time for 50% when the first current limiting level is set to conventional 4 amperes is 100%. The numerals provided in the parentheses indicate the magnifications of the first current limiting level from the conventional 4 amperes.

As shown in FIG. 10, when the first current limiting level is set to 7 amperes, the reduction rate of the required time for 50% is 56%, a reduction of 44%. In general, when the obtained luminous flux reaches 50% of the luminous flux obtained with the normal lighting, viewers can clearly recognize the characters or images that the projectors project on the screen. Accordingly, the reduction of 44% in the required time for 50% is regarded as a high degree of effectiveness.

Also, typical viewers can sense that the light rise time has become shorter than before when the reduction rate of the required time for 50% is 87% (when the first current limiting level is 5 amperes). As a result, it is desirable to supply, in the first lighting period, the lamp current that is not lower than 1.25 times the constant power control maximum current value.

It should be noted here that although theoretically, there is no limit to the first current limiting level, the higher the first current limiting level is, the larger the electronic parts or the like in the lighting apparatus are. Accordingly, from the viewpoint of cost reduction, it is desirable to set the current value to approximately 10 amperes at a maximum.

4. Lighting Apparatus

Figure 11:
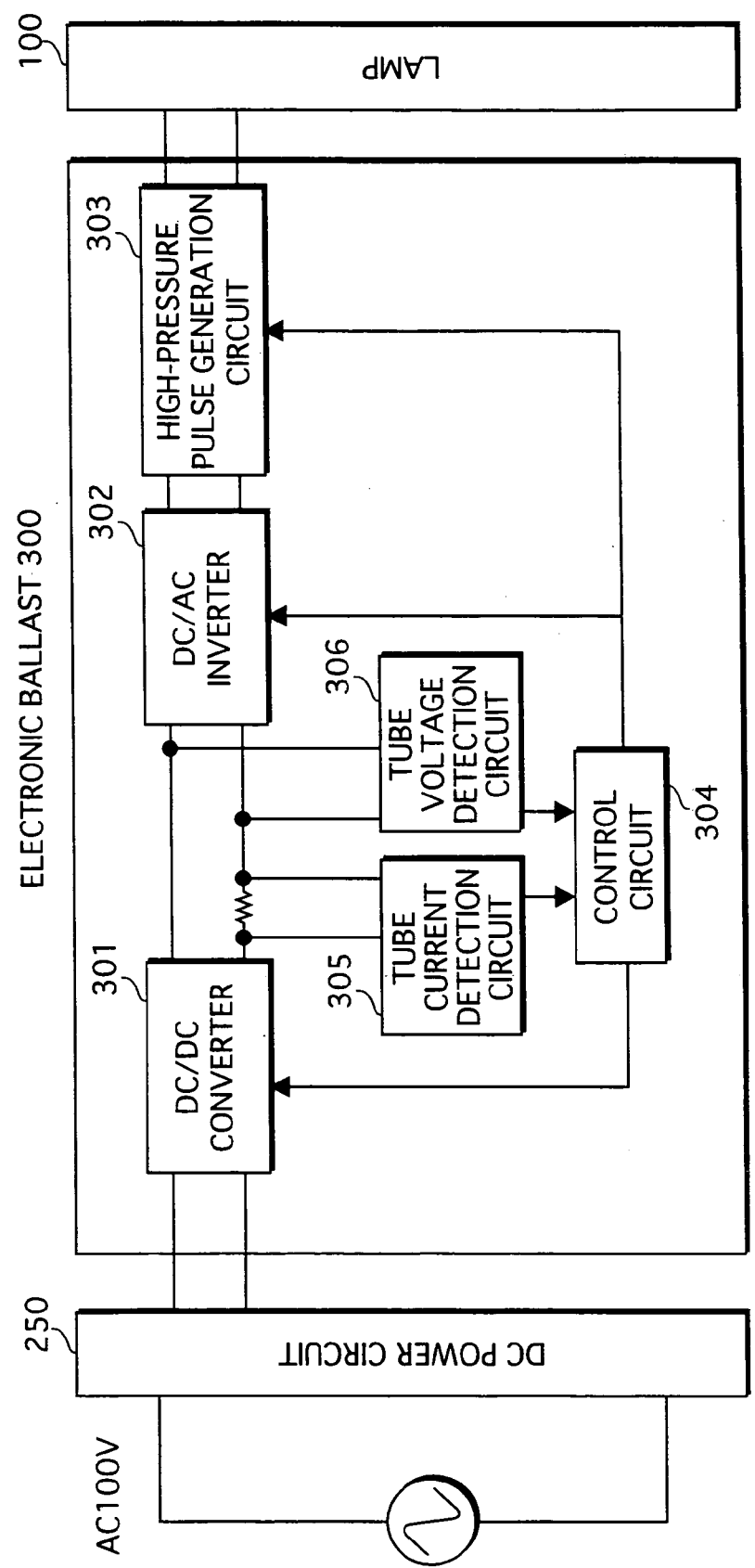
FIG. 11 is a block diagram showing the construction of the lighting apparatus for lighting the high pressure mercury lamp in the embodiment of the present invention.

FIG. 11 is a block diagram showing the construction of the lighting apparatus for lighting the high pressure mercury lamp 100.

As shown in FIG. 11, the lighting apparatus includes a DC power circuit 250 and an electronic ballast 300. The electronic-ballast 300 includes a DC/DC converter 301, a DC/AC inverter 302, a high-pressure pulse generation circuit 303, a control circuit 304, a tube current detection circuit 305, and a tube voltage detection circuit 306.

The DC power circuit 250 generates a direct-current voltage from a 100V home alternating-current power supply, and supplies the generated direct-current voltage to the electronic ballast 300. In the electronic ballast 300, the DC/DC converter 301 converts the direct-current voltage received from the DC power circuit 250 into a direct-current voltage of a predetermined level, and supplies the direct-current voltage of the predetermined level to the DC/AC inverter 302.

The DC/AC inverter 302 generates a rectangular alternating current having a predetermined frequency, and applies the generated rectangular alternating current to the high pressure mercury lamp 100. The high-pressure pulse generation circuit 303, which is required to cause the high pressure mercury lamp 100 to start discharging, includes, for example, a trans, and causes the high pressure mercury lamp 100 to start discharging by applying a high-pressure pulse generated in the trans to the high pressure mercury lamp 100.

The tube current detection circuit 305 and the tube voltage detection circuit 306, which are respectively connected to the inputs of the DC/AC inverter 302, indirectly detect a lamp current and a lamp voltage of the high pressure mercury lamp 100, respectively, and transmits signals indicating the detection of the lamp current and voltage to the control circuit 304. It should be noted here that the lamp current and voltage detected by the tube current detection circuit 305 and the tube voltage detection circuit 306 are different from actually measured values thereof. Accordingly, the control circuit 304 obtains lamp current and voltage values that are substantially equal to the actually measured values by multiplying the values of the lamp current and voltage detected by the tube current detection circuit 305 and the tube voltage detection circuit 306 by predetermined values of the current and voltage correction factors, respectively.

The control circuit 304 controls the DC/DC converter 301 and the DC/AC inverter 302 based on (a) the lamp current and voltage detection indication signals and (b) the memory stored in the internal memory, so as to light the high pressure mercury lamp 100 by the above-described lighting method.

Figure 12:
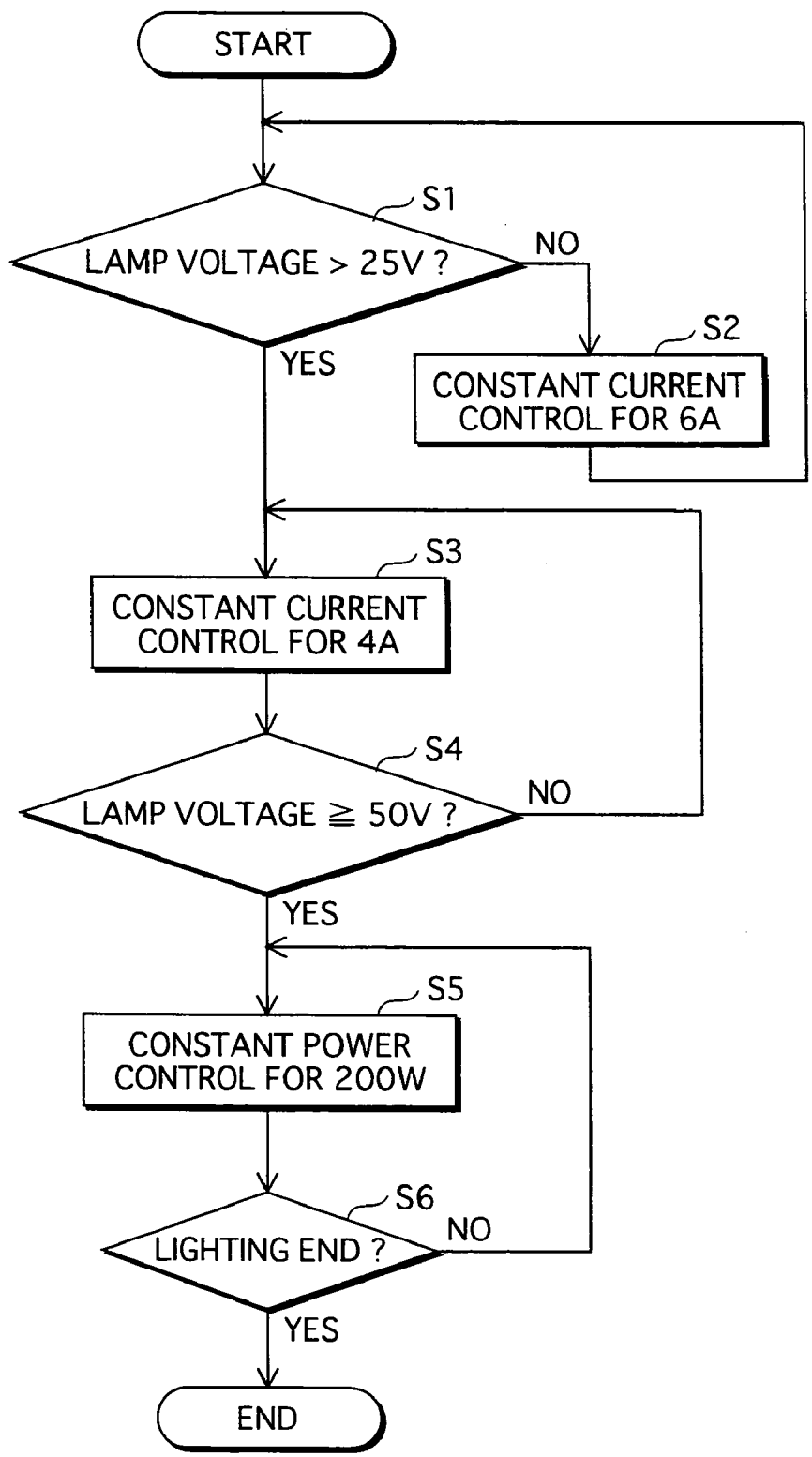
FIG. 12 is a flow chart showing the procedure of the lighting control performed by the control circuit of the lighting apparatus shown in FIG. 11.

FIG. 12 is a flowchart showing the procedure of the control performed by the control circuit 304 for lighting the high pressure mercury lamp 100 rated as 200 W after the dielectric breakdown. It should be noted here that the control is performed based on the control characteristics shown in FIG. 2.

Instep Si, it is judged whether the lamp voltage is higher than 25 volts as the current switching voltage. If it is judged negatively in step S1 (NO in step S1), the control circuit 304 performs a constant current control with the current limiting level set to 6 amperes (step S2). If it is judged that the lamp voltage is higher than 25 in step S1, the control circuit 304 performs a constant current control with the current limiting level set to 4 amperes (step S3).

It should be noted here that the constant current control is performed by controlling the DC/DC converter 301 so as to maintain the lamp current at the set current limiting level, based on the lamp current detection indication signal sent from the tube current detection circuit 305.

When the lamp voltage rises and reaches 50 volts (YES in step S4), the control circuit 304 performs a constant power control so that the lamp power remains to be 200 W (step S5). The constant power control is continued until it is confirmed in step S6 that the lighting ends due to turning off of a power switch (not illustrated) or the like.

It should be noted here that the constant power control is achieved by the control circuit 304 monitoring the lamp current and the lamp voltage based on the signals indicating the detection of the lamp current and voltage by the tube current detection circuit 305 and the tube voltage detection circuit 306, and, for example, performing a feedback control on the current value output from the DC/DC converter 301 so that the lamp power, which is a product of the lamp current and the lamp voltage, is always 200 W.

The voltage to be applied to the high pressure mercury lamp 100 during the constant current control and the constant power control is an alternating current having a frequency ranging from approximately 50 Hz to 1,000 Hz.

5. Liquid Crystal Projector

The high pressure mercury lamp 100 provides high brightness for its smallness in size, and is therefore suitable for a light source for a liquid crystal projector. In such a case, the high pressure mercury lamp 100 is incorporated into a liquid crystal projector together with a reflecting mirror.

Figure 13:
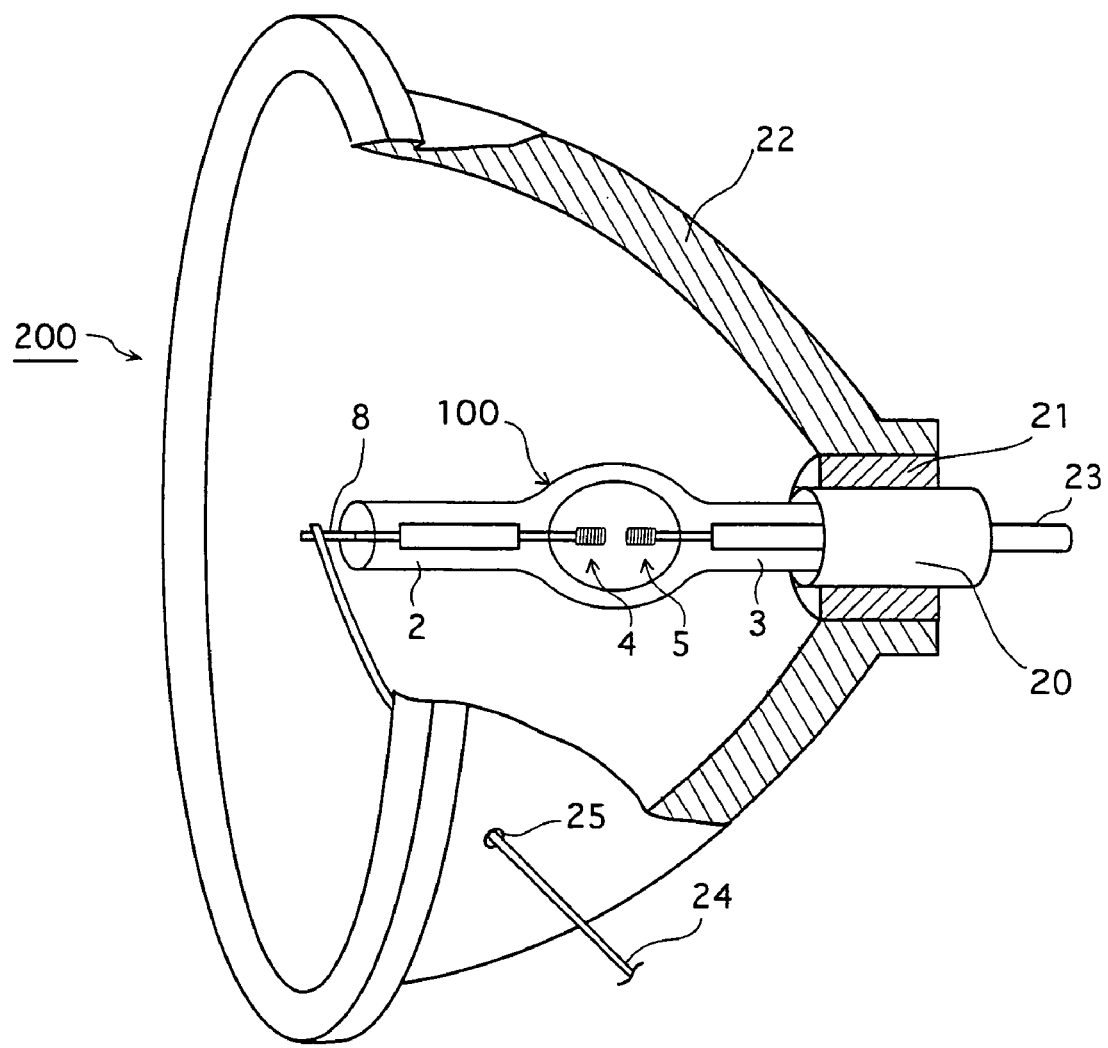
FIG. 13 is a cutaway view showing the construction of a lamp unit.

FIG. 13 is a cutaway view showing the construction of a lamp unit 200. As shown in FIG. 13, the lamp unit 200 is formed by attaching a base 20 to an end of the second seal portion 3 of the high pressure mercury lamp 100, and securing the high pressure mercury lamp 100 to a reflecting mirror 22, whose inner surface forms a concave mirror, by fixing the base 20 in a hole at the base of the reflecting mirror 22 by cement 21. In this construction, to increase the converging efficiency of the reflecting mirror 22, an adjustment is made so that a scheduled position of the discharge arc occurring between the electrodes 4 and 5 is substantially in a light axis of the reflecting mirror 22, when the high pressure mercury lamp 100 is secured to the reflecting mirror 22. Power is supplied to the lead 8 (see FIG. 1) of the high pressure mercury lamp 100 via a lead wire 24 that is pulled out to outside through a through-hole 25 formed in the reflecting mirror 22. Power is also supplied to the lead 9 (see FIG. 1) of the high pressure mercury lamp 100 via a terminal 23.

Figure 14:
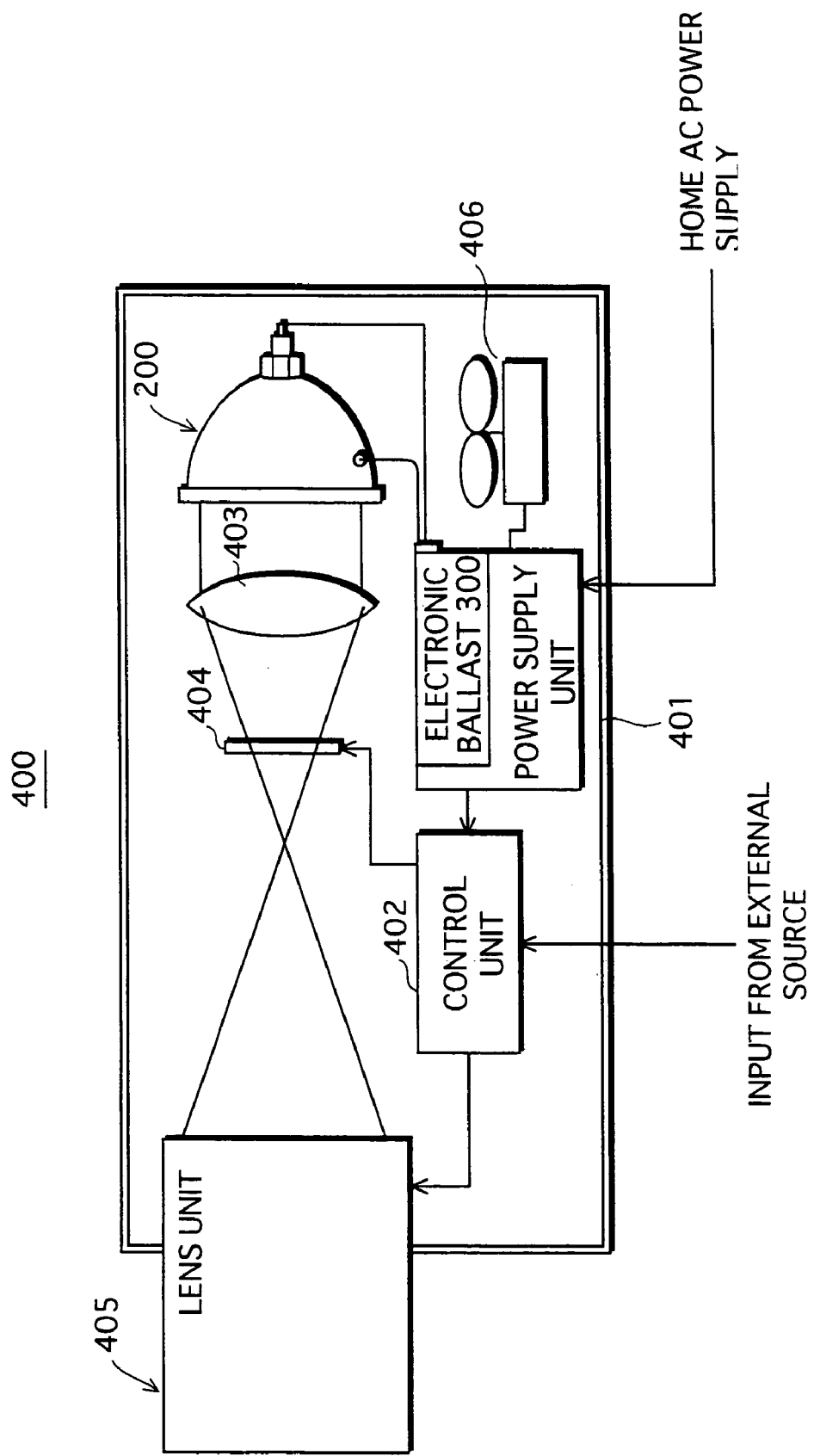
FIG. 14 is a block diagram showing the construction of a liquid crystal projector that includes the lighting apparatus shown in FIG. 11.

FIG. 14 shows the construction of a liquid crystal projector 400 that includes the lamp unit 200 described above and the lighting apparatus shown in FIG. 11.

As shown in FIG. 14, the liquid crystal projector 400 includes a power supply unit 401 containing the above-described electronic ballast 300, a control unit 402, a converging lens 403, a transparent color liquid crystal display plate 404, a lens unit 405 embedding therein a driving motor, and a cooling fan apparatus 406.

The power supply unit 401 generates a direct-current voltage from a 100V home alternating-current power supply, and supplies the generated direct-current voltage to the electronic ballast 300, the control unit 402 and the like. The control unit 402 drives the color liquid crystal display plate 404 so as to display a color image based on the image signals input from outside. The control unit 402 also controls the driving motor in the lens unit 405 so as to perform a focusing operation and a zooming operation.

The light beams emitted from the lamp unit 200 pass through: the converging lens 403 that converges the light beams; the transparent color liquid crystal display plate 404 on which an image is formed; and the lens unit 405, and go toward a screen (not illustrated). With this construction, the image is projected on the screen.

In regards with such liquid crystal projectors, which have become widespread for business use in recent years, increase in the brightness and reduction in the light rise time have been a technological challenge. As described above, the high pressure mercury lamp 100, which contains the lighting apparatus of the present invention, is suitable for a light source for a liquid crystal projector (hereinafter, such a light source apparatus having the lighting apparatus of the present invention is also referred to as a "high pressure discharge lamp apparatus") Use of the high pressure discharge lamp apparatus contributes to overcoming of the above-said technological challenge.

Off course, the high pressure discharge lamp apparatus of the present invention can be applied to other projection-type image display apparatuses than liquid crystal projectors.

6. Modifications

The present invention is not limited to the above-described embodiment, but can be modified in a variety of ways. Following are such examples.

<6-1> In the above-described embodiment, constant current controls are performed in the first and second lighting periods with use of the first and second current limiting levels, respectively. However, constant current controls may not necessarily be performed. This is because the reduction in the light rise time is achieved by supplying, during the first lighting period, a current that is higher than the maximum current value for the constant power control, and the electrodes are not damaged if a current that is not higher than the maximum current value for the constant power control is supplied during the second lighting period.

Figure 15:
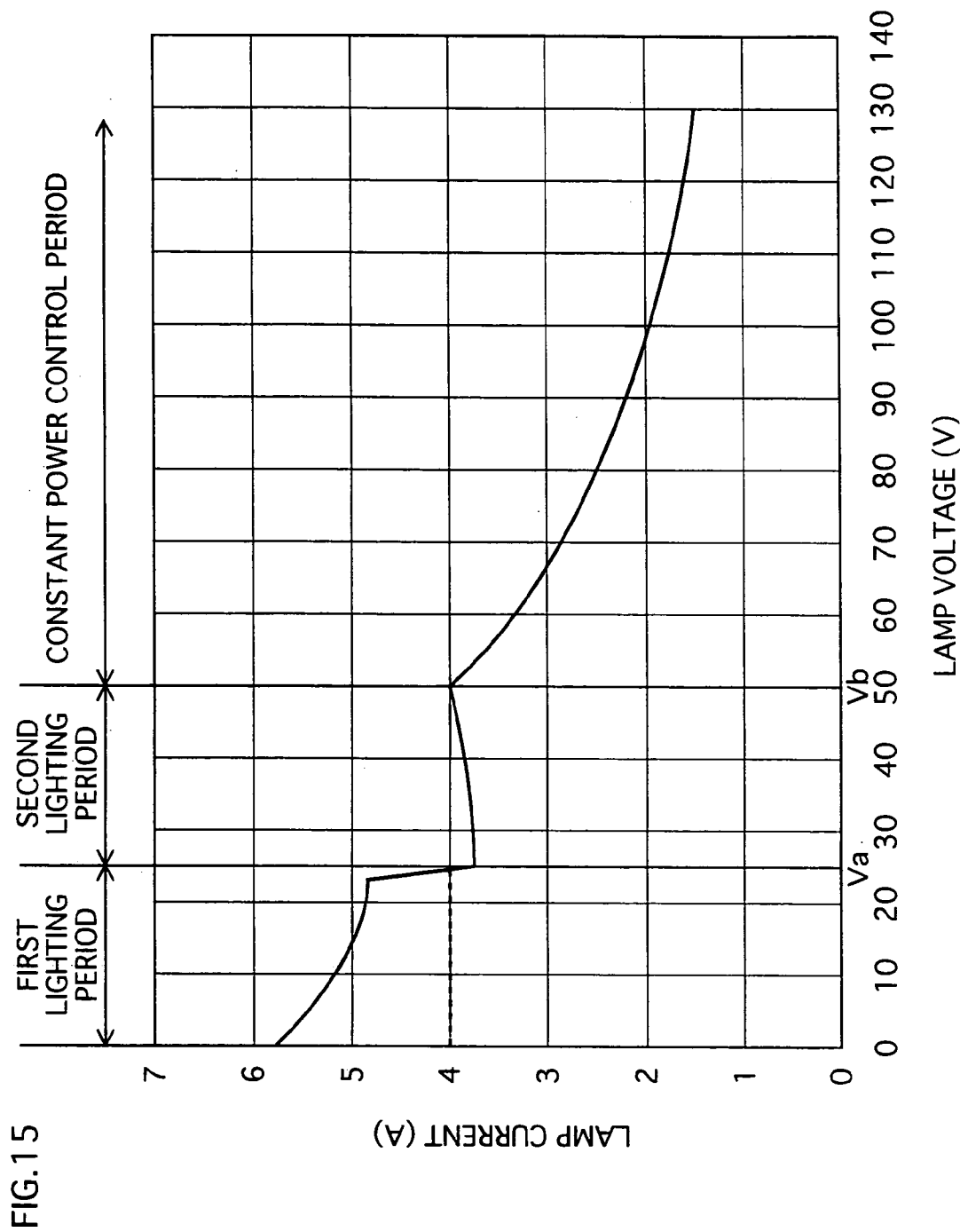
FIG. 15 is a plot of lamp current vs. lamp voltage supplied to the high pressure mercury lamp in a modification to the embodiment of the present invention.

For example, as shown in FIG. 15, in the first lighting period, the supplied current may be changed (increased or decreased) gradually in a range higher than the maximum current value for the constant power control (4 amperes), and in the second lighting period, the supplied current may be changed gradually in a range not higher than the maximum current value for the constant power control. Alternatively, as shown in FIG. 16, in the first lighting period, the supplied current may be changed (increased or decreased) to form steps in a range higher than the maximum current value for the constant power control (4 amperes), and in the second lighting period, the supplied current may be changed to form steps in a range not higher than the maximum current value for the constant power control.

It should be noted here that in the second lighting period, to reduce the light rise time as much as possible, it is desirable that a constant current control is performed with a current value that is substantially equal to the maximum current value for the constant power control (the lamp is designed so that the electrodes are not damaged with the current value), as shown in FIG. 2.

Figure 16:
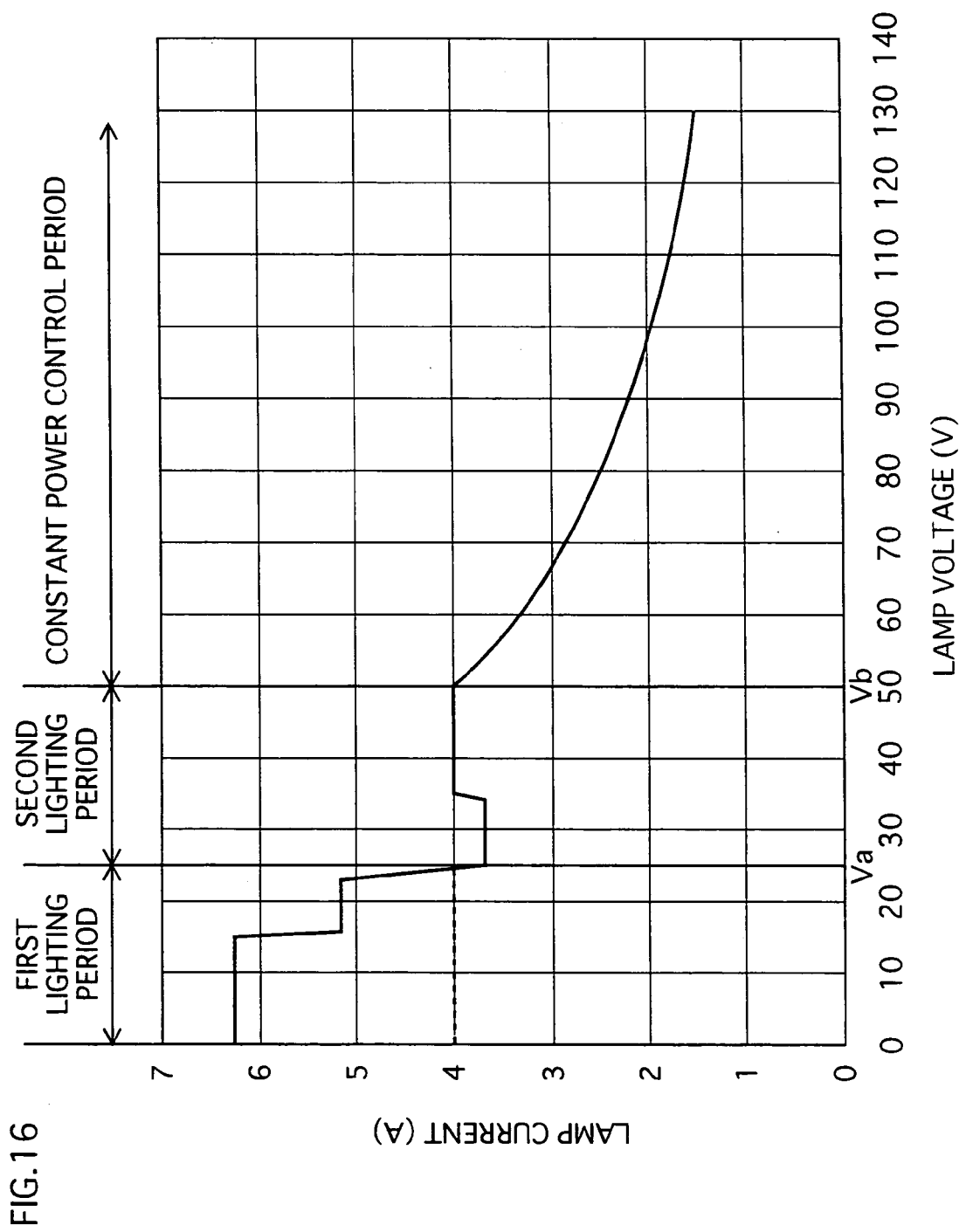
FIG. 16 is a plot of lamp current vs. lamp voltage supplied to the high pressure mercury lamp in a modification to the embodiment of the present invention.

It is expected that the modifications of FIGS. 15 and 16 requires a longer light rise time in the second lighting period than the above-described embodiment. This is because the second lighting period of the modifications include some periods during which a lamp current much lower than the maximum current value for the constant power control is supplied. However, despite this, the modifications succeed in reducing the light rise time because they supply a large power in the first lighting period, and thus supply a larger power than the conventional lamps in the first and second lighting periods in total.

<6-2> A large current may not be supplied for the whole duration of the first lighting period, but may be supplied for a partial duration thereof. Even in such a case, the effect of reducing the light rise time is obtained in so far as a current higher than the maximum current value for the constant power control is supplied. The effect increases in proportion to the difference between the current and the maximum current value for the constant power control.

<6-3> In the above-described embodiment, a high pressure mercury lamp is used as a high pressure discharge lamp for a projector. However, a metal halide lamp or the like may be used instead as a high pressure discharge lamp for a projector. This is because such a lamp operates on the same lighting principle as the high pressure mercury lamp, and as is the case with the high pressure mercury lamp, the lamp voltage increases as the internal metal vapor pressure increases, and an arc spot starts to be formed continuously when the lamp voltage reaches a predetermined value. In such a lamp, the electrodes are not damaged if a large amount of current is supplied before the arc spot starts to be formed, and the light rise time is reduced.

Off course, the present invention can reduce the light rise time in high pressure discharge lamps that are not dedicated to projectors.

<6-4> In the above-described embodiment, the electrodes of the high pressure discharge lamps are formed by winding electrode coils around ends of electrode rods. However, not limited to this, the electrodes may be formed by further melting the ends of the electrodes together with part of the electrode coils to be hemisphere by laser beams.

Such an arrangement makes the ends of the electrodes difficult to melt. Electrodes formed in this way give lamps longer lives than the electrodes shown in FIG. 6A. However, in common with the lamp of the above-described embodiment, a current that is higher than the maximum current value for the constant power control should not be supplied after the first lighting period. This is because if such a large amount of current is supplied after the first lighting period, an electrode is damaged at a position near the arc spot none the less.

As described above, the present invention of the lighting method or apparatus for a high pressure discharge lamp enables the light rise time to be reduced without damage to the electrodes by supplying a large current during the first lighting period that starts with the lighting start and lasts until the lamp voltage reaches a predetermined voltage. Also, supplying a large current immediately after a lighting start accelerates the warm-up of the electrodes. Therefore, it can be said that the present invention provides a lighting method or apparatus that improves starting of a high pressure discharge lamp.

The present invention also achieves a projection-type image display apparatus that starts with reliability and has a short light rise time, by incorporating therein, as a light source apparatus for the projection-type image display apparatus, a high pressure discharge lamp apparatus that is a combination of the lighting apparatus and a high pressure discharge lamp.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lighting method for a high pressure discharge lamp, comprising, during an initial lighting period between a lighting start and a constant power control that is performed when a lamp voltage reaches a predetermined voltage value:
   a first step in which a first lamp current, which is higher than a predetermined current value, is supplied for a partial or whole duration of a first lighting period that starts with the lighting start and lasts until the lamp voltage reaches a first voltage value at which an arc spot starts to be formed continuously on an electrode; and
   a second step in which a second lamp current, which is not higher than the predetermined current value, is supplied for a partial or whole duration of a second lighting period that succeeds the first lighting period and lasts until the constant power control is performed.

2. The lighting method of claim 1, wherein
   the predetermined current value is substantially equal to a maximum value of a current which is supplied while the constant power control is performed.

3. The lighting method of claim 1, wherein
   the first lamp current supplied in the first lighting period is not lower than 1.25 times the predetermined current value.

4. A lighting method for a high pressure discharge lamp in which an inter-electrode distance ranges from 0.5 mm to 2.0 mm inclusive, an amount of mercury contained therein ranges from 150 mg/cm$^3$ to 350 mg/cm$^3$ per inner capacity of a light-emitting portion, and argon, krypton or xenon is introduced as a rare gas into an inner space at a pressure ranging from 10 kPa to 40 kPa inclusive, the lighting method comprising, during an initial lighting period between a lighting start and a constant power control that is performed when a lamp voltage reaches a predetermined voltage value:
   a first step in which a first lamp current, which is higher than a predetermined current value, is supplied for a partial or whole duration of a first lighting period that starts with the lighting start and lasts until the lamp voltage reaches a first voltage value that is not higher than 27 volts; and a second step in which a second lamp current, which is not higher than the predetermined current value, is supplied for a partial or whole duration of a second lighting period that succeeds the first lighting period and lasts until the constant power control is performed.

5. The lighting method of claim 4, wherein
the predetermined current value is substantially equal to a maximum value of a current which is supplied while the constant power control is performed.

6. The lighting method of claim 4, wherein
the first lamp current supplied in the first lighting period is not lower than 1.25 times the predetermined current value.

7. A lighting apparatus for a high pressure discharge lamp, for performing a constant power control over the high pressure discharge lamp when a lamp voltage reaches a predetermined voltage value after a dielectric breakdown is caused to light the high pressure discharge lamp, the lighting apparatus comprising:
　a current supply unit operable to supply a current to the high pressure discharge lamp; and
　a current control unit operable to control the current supply unit so that a first lamp current, which is higher than a predetermined current value, is supplied for a partial or whole duration of a first lighting period that starts with the lighting start and lasts until the lamp voltage reaches a first voltage value at which an arc spot starts to be formed continuously on an electrode, a second lamp current, which is not higher than the predetermined current value, is supplied for a partial or whole duration of a second lighting period that succeeds the first lighting period and lasts until the constant power control is performed.

8. The lighting apparatus of claim 7, wherein the predetermined current value is substantially equal to a maximum value of a current which is supplied while the constant power control is performed.

9. A lighting apparatus for a high pressure discharge lamp in which an inter-electrode distance ranges from 0.5 mm to 2.0 mm inclusive, an amount of mercury contained therein ranges from 150 mg/cm$^3$ to 350 mg/cm$^3$ per inner capacity of a light-emitting portion, and argon, krypton or xenon is introduced as a rare gas into an inner space at a pressure ranging from 10 kPa to 40 kPa inclusive, the lighting apparatus performing a constant power control over the high pressure discharge lamp when a lamp voltage reaches a predetermined voltage value after a dielectric breakdown is caused to light the high pressure discharge lamp, the lighting apparatus comprising:
　a current supply unit operable to supply a current to the high pressure discharge lamp; and
　a current control unit operable to control the current supply unit so that a first lamp current, which is higher than a predetermined current value, is supplied for a partial or whole duration of a first lighting period that starts with the lighting start and lasts until the lamp voltage reaches a first voltage value that is not higher than 27 volts, and a second lamp current, which is not higher than the predetermined current value, is supplied for a partial or whole duration of a second lighting period that succeeds the first lighting period and lasts until the constant power control is performed.

10. The lighting apparatus of claim 9, wherein
the predetermined current value is substantially equal to a maximum value of a current which is supplied while the constant power control is performed.

* * * * *